United States Patent [19]

Chuang et al.

[11] Patent Number: 4,941,155
[45] Date of Patent: Jul. 10, 1990

[54] METHOD AND CIRCUITRY FOR SYMBOL TIMING AND FREQUENCY OFFSET ESTIMATION IN TIME DIVISION MULTIPLE ACCESS RADIO SYSTEMS

[75] Inventors: Justin C. Chuang, Eatontown; Nelson R. Sollenberger, Tinton Falls, both of N.J.

[73] Assignee: Bell Communications Research, Inc., Livingston, N.J.

[21] Appl. No.: 437,758

[22] Filed: Nov. 16, 1989

[51] Int. Cl.$^5$ .............................................. H03D 3/22
[52] U.S. Cl. .......................................... 375/84; 375/106
[58] Field of Search ................... 375/56, 84, 106, 110; 370/100.1, 104.1; 329/304; 455/33, 38; 379/59, 60, 63

[56] References Cited

U.S. PATENT DOCUMENTS

| | | | |
|---|---|---|---|
| 3,675,139 | 7/1972 | Guest | 329/305 |
| 4,146,841 | 3/1979 | McRae | 375/84 |
| 4,849,991 | 7/1989 | Arnold et al. | 375/106 |
| 4,879,728 | 11/1989 | Tarallo | 329/306 |

OTHER PUBLICATIONS

"Portable Digital Radio Communications—An Approach to Tetherless Access", Cox, IEEE Communications Magazine, vol. 27, No. 7, pp. 30–40, Jul. 1989.
"Universal Digital Portable Radio Communications", Cox, Proceedings of the IEEE, vol. 75, No. 4, pp. 436–476, Apr. 1987.

Primary Examiner—Douglas W. Olms
Assistant Examiner—Stephen Chin
Attorney, Agent, or Firm—James W. Falk; Stephen M. Gurey

[57] ABSTRACT

In order to correctly demodulate a received sequential burst of symbols in a time division multiplexed/time division multiple access (TDM/TDMA) portable radio digital telephony communications system, proper timing of the sampling time in each received symbol of the burst is necessary. In addition, in order to compensate for component drift, an estimate of the frequency offset between transmitting and receiving units is also required. A method and circuitry for estimating symbol timing and frequency offset is disclosed in which the IF radio signal is sampled and digitized at a sampling rate which is sixteen times the symbol rate. The digitized samples are processed to obtain phase values. A one symbol delay is introduced and differential phase values derived, a differential phase value being derived for each of the sixteen sampling times per symbol. The differential values are collapsed into one quadrant in the phase plane and then expanded back to the full plane. For each of the sixteen sampling times, a separate vector sum is formed of the expanded and collapsed differential phase values over substantially the entire burst. Symbol timing is selected to be the particular one-of-the-sixteen sampling times at which the vector sum has the largest magnitude. Frequency offset is directly determined from the angle in the phase plane of that vector having the largest magnitude.

30 Claims, 4 Drawing Sheets

METHOD AND CIRCUITRY FOR SYMBOL TIMING AND FREQUENCY OFFSET ESTIMATION IN TIME DIVISION MULTIPLE ACCESS RADIO SYSTEMS

BACKGROUND OF THE INVENTION

The invention relates to the processing of received digitally modulated radio signal transmissions in a time division multiplexed/time division multiple access (TDM/TDMA) system, such as that which will be used in conjunction with low power portable digital telephony, and more particularly to determining for each burst of received symbols, the optimum symbol time and frequency offset estimation for coherently demodulating the burst.

People by their very nature are highly mobile; no where is this more true than in modern day society with its myriad forms of travel. At the same time, many people increasingly have a need to be able to telephonically communicate with others particularly while they are on "the go", i.e. while they are moving.

However, this need for mobile communications, which existed for quite some time, has remained basically unsatisfied. Since telephones traditionally have cords, any movement of the telephone was traditionally limited by the length of its cord. For many years, only a veritable handful of telephones actually traveled with their users. These mobile telephones included aeronautical, marine and other forms of early radio telephones. Inasmuch as these mobile telephones were priced well beyond the affordability of the average telephone subscriber, none of these radio telephones ever encountered widespread use. Accordingly, for the vast majority of subscribers, a telephone set was installed at each subscriber location and there it remained unless it was reinstalled elsewhere. Thus, these subscribers either remained close to their telephone and thus restricted their mobility particularly in the anticipation of receiving a telephone call, or intentionally sought out a public or private telephone located along their route of travel whenever the need arose to place a telephone call.

Now with increasing sophistication of miniaturized electronic technology and decreasing attendant cost thereof, various vendors provide a number of devices (and/or services) that offer tetherless telephony. These devices, explained in more detail below, attempt to free a subscriber from being bound by the ambulatory constraints imposed by existing wireline telephone sets. In effect, each of these devices now permits subscribers effectively, at least with a certain extent, to take their telephone with them, obtain exchange access, and remain in communication wherever they go. These devices include cordless telephones, cellular mobile radio transceivers, public packet radio data network transceivers and radio pagers. As a growing number of consumers perceived the freedom of movement offered by these devices, a large demand was created for these devices. Moreover and not unexpectedly, as the prices of these devices continue to fall due to manufacturing economies and technical developments, the demand for these devices correspondingly continues to substantially increase. Specifically, approximately 25 million cordless telephone sets are in use today throughout the United States with demand for these sets continuing to rise as the price of cordless telephones with increasing sophisticated has remained within a $100.00 to $200.00 range. In addition, approximately three million cellular telephone sets are currently in use throughout the United States. As the price of various cellular sets falls from more than a $1000.00 which occurred merely a year ago to only a few hundred dollars today, the demand for these sets has increased precipitously. As a result, the number of installed sets has climbed at such an astonishing rate that in certain urban areas, such as New York, the number of sets in use at peak times is beginning to strain the capacity of the existing cellular network to handle the concomitant call traffic.

While, each of the present tetherless telephonic technologies possesses certain advantages, each technology also unfortunately has certain drawbacks that significantly restrict its use. In this regard, see, e.g., Cox, "Portable Digital Radio Communications—An Approach to Tetherless Access", IEEE Communications Magazine, Vol. 27. No. 7, Jul. 1989 pages 30–40; and Cox, "Universal Digital Portable Radio Communications", Proceedings of the IEEE, Vol. 75, No. 4, Apr. 1987, pages 436–476.

Specifically, as to cordless telephones, such a telephone consists of two transceivers: a base unit and a handset, that collectively form a low power duplex analog radio link. The base unit is connected, typically by a subscriber to a wireline access point in a conventional telephone network in lieu of or as a replacement for a wireline telephone, in order to implement a tetherless substitute for a telephone cord. Once connected, the base unit appears to the telephone network as a conventional telephone. The base unit contains a transmitter and a receiver, and simple control and interface apparatus for dialing, accepting ringing, terminating calls and coupling voice from the telephone line to the transmitter and from the receiver within the base unit to the telephone line. The handset, which is truly portable, contains simple control logic for initiating, receiving and terminating calls with the base unit and for turning its own transmitter on and off. To provide true duplex operation, separate carrier frequencies are used by the transmitters in the base unit and handset. Since cordless telephones operate with very low input power to their transmitter, usually on the order of only several milliwatts, the handset generally utilizes several small rechargeable batteries as its power source. This enables the handset to be made relatively small, lightweight and to be continuously used for a relatively long period, typically several hours, before its batteries require recharging. Furthermore, the very low level of power radiated from the handset poses essentially no biological radiation hazard to its user.

Unfortunately, the primary disadvantage of cordless telephones is their highly limited service area. Because cordless telephones use relatively low transmitter power, these telephones have a maximum range that varies from typically a few hundred to a thousand feet, which in turn results in a very small service area. A secondary disadvantage associated with cordless telephones stems from the limited number of available frequencies. At present, only a few separate frequencies, typically up to 10 duplex channels, have been allocated by the Federal Communications Commission (FCC) for use by cordless telephones. Moreover, early cordless telephones by their very design have been very susceptible to co-channel interference. This interference arises by the simultaneous operation of two or more cordless telephones situated in close proximity to each other, such as in an immediate neighborhood of a residential area. In a very small geographic area with a very low density of users, a reasonable probability exists that within this area one or more duplex pairs will not be in use at any one time, and, as such, this interference will not occur therein. Nevertheless, in an effort to avoid this interference, relatively sophisticated cordless telephones are now capable of operating on any one of a number of preprogrammed duplex pairs with either the user or the telephone itself selecting, manually in the case of the user and automatically by the telephone, the specific pair that is to be used at any one time. Unfortunately, if a sufficient number of cordless telephones are in use in a very densely populated area, such as an apartment building, pair selection may not be sufficient to eliminate the expected incidences of co-channel interference that results from undisciplined and uncoordinated duplex pair assignment and the resulting chaos experienced by users situated therein. In addition, since cordless telephones rely on analog modulation of a duplex pair, conversations occurring over a cordless telephone are highly vulnerable to eavesdropping. Furthermore, a cordless telephone only provides limited protection against unauthorized long distance or message units calls being made therethrough. While preprogrammed digital or tone access codes are being used between individual handset-base unit pairs and provide sufficient protection against casual attempts at unauthorized access, these codes are not sufficiently sophisticated to successfully deter a determined orderly assault on a cordless telephone by an unauthorized user. Furthermore, while cordless telephones provide limited portable radio access to a wireline access point, from a network standpoint cordless telephones do not eliminate the need for telephone lines, i.e. a customer drop, to be run to each subscriber.

Nonetheless, in spite of these severe service restrictions, cordless telephones are immensely popular for the freedom, though very limited, that they furnish to their users.

In contrast to the very limited range provided by cordless telephones, cellular mobile radio systems accommodate wide ranging vehicular subscribers that move at relatively high speeds. These systems utilize a relatively high power 850 MHz transmitter, typically operating at an input of approximately 0.5 watt to several tens of watts, in a mobile unit with a relatively high efficiency antenna to access a wireline telephone network through a fixed cell-site (base station). The base station also uses a high power transmitter in conjunction with a tall antenna, typically erected on a tower or tall building, to provide a relatively large coverage area. Due to the expense, typically ranging to $300,000 exclusive of land and building costs, and the antenna size associated with each base station, the least number of base stations are often used to cover a given area. Nonetheless, this arrangement generally provides a circular service area centered on a base station with a radius of approximately 5–10 miles therefrom. In use, a cellular radio system that covers a large region often encompassing a city, its suburbs and major access highways typically includes a number of geographically dispersed base stations. The base stations, containing radio receivers and transmitters and interface and control electronics, are connected by trunks to, and coordinated and controlled by one or more Mobile Telephone Switching Offices (MTSOs) that, in turn, also provide access to the conventional wireline telephone network. All of the duplex radio channels available to the entire system are sub-divided into sets of channels. The radio equipment in each base station has the capability of using channels from one of the channel sets. These sets are allocated to the base station in a pattern that maximizes the distance between base stations that use the same sets so as to minimize average co-channel interference occurring throughout a service region. One or more channels are designated for initial coordination with the mobile sets during call setup.

Each mobile (or hand-held) cellular transceiver used in the system contains a receiver and a transmitter capable of operating on any duplex radio channel available to the cellular system. Calls can be made to or from any mobile set anywhere within the large region covered by a group of base stations. The control electronics in the mobile transceiver coordinates with a base station on a special call setup channel, identifies itself, and thereafter tunes to a channel designated by the base station for use during a particular call. Each duplex channel uses one frequency for transmission from base-to-mobile and a different frequency for transmission from mobile-to-base. The signal strength of calls in progress is monitored by the base stations that can serve those calls. Specifically, when the signal strength for a given call drops below a predetermined threshold, typically due to movement of the cellular subscriber from one cell to another, the MTSO connected to that base station coordinates additional signal strength measurements from other base stations which surround the station that is currently handling the call. The MTSO then attempts to switch ("handoff") the call to another duplex channel if one of the other base stations is receiving a stronger signal than that being received at the base station that is currently handling the call. This handoff of calls, totally transparent to the cellular subscriber, preserves the quality of the radio circuit as the subscriber moves throughout the service region. Moreover, calls are handed off from one MTSO to another, as the subscriber transits from one service area into another. Inasmuch as frequency usage is coordinated, relatively efficient use is made of the available frequency spectrum while minimizing the likelihood co-channel interference. In each different geographic service area within the United States, there are two competing cellular systems using different frequencies.

Though cellular mobile radio systems provide wide range, these systems suffer various drawbacks. First, cellular systems were originally designed for use in motor vehicles whose electrical systems could readily provide sufficient power. While portable hand-held cellular transceivers do exist, they must operate with sufficient transmitter input power, typically at least 0.5 watt, to reliably reach a base station. This, in turn, requires that a relatively large battery must be used within the portable cellular transceiver. However, due to the limits of present rechargeable battery technology, the amount of time that the portable transceiver can be used before it requires recharging is often quite limited. Furthermore, the cost of these rechargeable batteries and hence of the portable transceiver is rather high. Moreover, high radiated power levels, such as that which emanate from a mobile or portable cellular transceiver, may be sufficient to pose a potential biological radiation hazard to its user. Furthermore, since cellular systems were not designed to compensate for radio attenuation occurring within buildings, these systems are only able to provide little, if any, service within a building. Low power portable cellular transceivers are not operationally compatible with large cell sizes, designed to match the needs of fast moving vehicular users, and thus often provide poor communication in many areas within these cells. In addition, since cellular systems rely on merely frequency modulating a carrier with voice or data, these systems are also susceptible to eavesdropping. Lastly, from a network perspective, cellular systems are quite inefficient. Due to the inclusion of MTSOs with trunks connected to individual base stations, backhaul of cellular traffic, over wired trunks, often occurs over several miles prior to its entrance into the wireline network, thereby resulting in a wasteful overbuild of network transport facilities.

Public packet radio data networks presently exist to handle infrequent bursts of digital data between a fixed base station and a number of portable data transceivers. The fixed site has a transmitter that uses several tens of watts; while each portable data transceiver uses a transmitter that operates at a level of several watts. As such, reliable coverage is provided over a service area that may extend several miles in radius from a base station. Individual base stations are connected by a fixed distribution facility to a controller that can, in turn, be connected to either a local exchange network, to handle voice-band data, or a packet-data network which itself interconnects various computers. Multiple users contend for transmission time on typically a single radio channel. Data transmissions on the channel are set up in either direction through bursts of coordinating data, handshaking, that occur between a base station and a portable data transceiver. Appropriate controller and radio link protocols are used to avoid packet collisions. Once a data transfer is complete between that base station and a data transceiver, the channel is immediately available for reuse by others. Although data bursts are transmitted at relatively high power, each burst is transmitted for only a short duration. As such, the average power consumption for a portable data transceiver is far less than that associated with a portable cellular transceiver thereby allowing physically smaller internal batteries to be used with portable data transceivers than those used in portable cellular transceivers. Nevertheless, the high radiated power levels associated with a portable data transceiver again pose a potential biological radiation hazard to its user. In addition, these networks disadvantageously suffer from limited digital transmission capacity which restricts these networks to carrying short data bursts and not voice, and, like cellular systems, experience coverage restraints when used within buildings.

In contrast to the tetherless systems discussed above, radio paging systems provide simple unindirectional transmission from a fixed location to a specifically addressed portable pager, which when received provides an alerting tone and/or a simple text message. Paging systems provide optimized one-way communication over a large region through a high power transmitter, typically a few kilowatts, that uses high antennas at multiple sites to provide reliable coverage throughout the region. Satellite based paging systems are also in operation to provide extended service regions. Since a pager is merely a receiver with a small annunciator, its power requirement is very low. As such, a pager is quite small, light weight, reliable, relatively low cost, and can operate for long intervals before its batteries need to be recharged or replaced.

Due to the advantages in size, cost and operating duration offered by pocket pagers, attempts exist in the art, to impart limited two-way communication into paging systems which are themselves highly optimized for one-way traffic. One such attempt includes incorporation of an "answer back" message through "reverse" transmission links between the individual pagers and the fixed sites. While these attempts have met with great difficulty, these attempts nevertheless indicate that a substantial demand exists for an inexpensive two-way portable truly tetherless telephonic service that overcomes the range limitations associated with cordless telephones and the weight and cost limitations associated with portable cellular systems.

Furthermore, various intelligent network services are now being offered by the local telephone operating companies in an attempt to provide wireline subscribers with a certain degree of call mobility when they are away from their own wireline telephones. These services include call transfer and call forwarding. Both call transfer and call forwarding allow a subscriber to program a local switch, using any pushbutton telephone, to transfer all subsequently occurring incoming calls that would otherwise be routed to this subscriber's telephone to a telephone associated with a different wireline telephone number that the subscriber desires anywhere in the world either for a given period of time, as in call transfer, or until that subscriber appropriately reprograms the switch with a different forwarding number, as in call forwarding. In this manner, the subscriber can, to a certain extent, continually instruct the telephone network to follow his or her movements and thereby route his or her incoming calls to a different number in unison with that subscriber's actual route of travel. Unfortunately, with these services, the subscriber must manually interact with the network and continually enter a new forwarding telephone number(s) coincident with his or her continuing travel such that the network is always cognizant of the current telephone number to which his calls are to be forwarded.

Thus, a substantial overall need exists in the art for a truly portable personal communication technology that is designed for pedestrian use and which utilizes small, lightweight and relatively inexpensive portable transceivers while eliminating, or at least substantially reducing, the performance drawbacks associated with the use of currently existing tetherless telephonic technologies in portable communication applications.

In an attempt to provide this needed technology, the art has turned to low power portable digital telephony. In essence, this technology, similar to cellular radio, uses a fixed base unit (hereinafter referred to as a port) and a number of mobile transceivers (hereinafter referred to as portables) that can simultaneously access that port on a multiplexed basis. However, in contrast to cellular radio, portable digital telephony uses low power multiplexed radio links that operate on a time division multiplexed/time division multiple access (TDM/TDMA) basis to provide a number of separate fully duplex demand-assigned digital channels between a port and each of its associated portables. Specifically, each port would transmit time division multiplexed (TDM) bit streams on a predefined carrier frequency, with, in turn, each portable that accesses that port responding by transmitting a TDMA burst on a common though different predefined carrier frequency from that used by the port. Quadrature phase shift keying (QPSK), with an inter-carrier spacing of 150 to 300 KHz and within a given operating frequency band situated somewhere between approximately 0.5 to 5 GHz would be used by both the port and portables. The power used by the transmitter in the portable would range between 5-10 milliwatts or less on average and provide a range of several hundred to a thousand feet. As such, the resulting low radiated power would pose essentially no biological radiation hazard to any user. In addition, the port antenna would be relatively small and suitable for mounting on a utility or light pole. With this transmission range, a port could simultaneously serve typically 20-30 separate locally situated portables. The same TDM channels would be reused at ports that are spaced sufficiently far apart to reduce co-channel interference to an acceptably low level but yet conserve valuable spectrum. To provide access to the wireline telephone network, each port would be interfaced, typically through a conventional fixed distribution facility, over either a copper or fiber connection to a switching machine at a local central office. The switching machine would be suitably programmed, in a similar manner as is an MTSO, to controllably and automatically handoff calls from one port to another as subscribers move their portables from port to port.

Due to the very limited transmitter power, each portable is anticipated to be very light-weight, physically small and provide a relatively long operating life between battery recharging or replacement. The cost to a subscriber for a portable is expected, through very large scale integrated (VLSI) circuit implementations, to reside in the range of $100.00 to $350.00. In addition, each port would require a relatively small electronic package and carry an overall expected cost of less than $25,000.00—which is far less, by at least an order of magnitude, than that of a current cellular base station. Moreover, the digital data carried on each channel could be readily encrypted to provide a desired degree of security and privacy against eavesdropping. Furthermore, with this technology, a port antenna, due to its small size, could be readily moved within a building to cope with signal attenuation occurring therein. Port spacings would be properly established within the building and frequency reuse would be properly controlled between these ports to provide portable service having an acceptably low level of co-channel interference to a high density of users situated therein.

From a network perspective, low power portable digital telephony is extremely attractive. At present, approximately $50-100 billion is invested by local operating telephone companies in costs associated with copper subscriber loops that run from distribution points to local telephone company demarcation points on individual customer drops. For a local telephone company, the per-subscriber cost of installing and maintaining a subscriber loop is generally greater at the loop end closest to a subscriber than at the far end thereof since the loop end is more dedicated to that subscriber than the far end is. Given the range provided by portable low power telephony, ports can be appropriately positioned throughout an area to provide radio link based exchange access and thereby substitute inexpensive mass produced VLSI circuitry for costly dedicated copper loops that would otherwise emanate from a distribution facility to an individual subscriber. Hence, by installing various ports throughout for example a building, significant labor intensive installation and maintenance tasks associated with rewiring of telephone drops and relocation of telephone equipment would be eliminated with substantial savings being advantageously realized in attendant subscriber costs as people are moved from office to office therein.

Now, with the attractiveness of low power portable digital telephony being readily apparent, its success, in great measure, hinges on achieving satisfactory performance through the use of TDMA. TDMA, as currently envisioned for use in low power portable digital telephony, will utilize time multiplexed 164-bit bursts for communication from each of the portables to an associated port and 180-bit TDM packets for communication from that port to each of these portables. To yield a data rate of 16 kbits/second, two successive TDM/TDMA time slots are assigned by the port to each portable in use. Each TDM packet that is transmitted by the port in any one TDM time slot contains 180 bits. Of these bits, the first sixteen bits contain a predefined framing synchronization pattern, the next three bits are dummy bits, followed by 161 bits in which the first 147 bits contained therein hold data and the last 14 bits hold a parity sequence. Unfortunately, different propagation delays between the port and its associated portables and timing differences, the latter resulting from clock jitter occurring between the port and these portables, will both occur. Hence, to prevent different TDMA bursts that are transmitted from different portables from overlapping in time, a guard time having a 16 bit duration is used in lieu of the frame synchronization pattern in each TDMA burst transmitted by a portable to the port. The transmitter in the portable remains off during this guard time. Accordingly, each TDM packet transmitted from the port to a portable contains 180 bits with a self-contained synchronization pattern; while each TDMA burst transmitted from a portable to the port contains only 164 bits and no synchronization pattern.

For quadrature phase shift keying transmission, the phase of the intermediate frequency (IF) carrier is modulated to one-of-four phase angles, separated by 90 degrees in the phase plane, in accordance with the bit pattern to be transmitted. Each symbol, consisting of plural cycles of the IF carrier at the modulated phase angle, thereby represents two bits in the data stream. Each TDM packet transmitted from the port to a portable thus contains 90 phase modulated symbols and each TDMA burst transmitted from a portable to the port contains 82 phase modulated symbols.

Although TDMA has been successfully used for quite some time in fixed microwave satellite communications, the use of TDMA in the art of low power portable digital telephony is quite new. In general, the art has traditionally shunned the use of TDMA in such single user applications for a variety of reasons, one of which being the complexity inherent in controlling a TDMA channel.

In this regard, one crucial function required in TDMA for use in low power telephony is the need to determine the optimum time within a symbol interval to sample the signal and decide what the phase angle in fact is. Once this optimum point for symbol timing is determined, all the symbols within a burst can be demodulated using carrier recovery circuitry and the burst decoded and converted to an analog speech signal. A problem inherent in radio telephony systems of this type transmitting between a stationary and moving station is that very minor changes in propagation characteristics cause the phase of the incoming carrier to either the port from the portable or to the portable from the port to change dramatically. As a result, the phase relative to zero degrees of each burst received by either the port of any portable is unknown even though a burst may have been received just a few milliseconds previously. Similarly, symbol timing varies from burst-to-burst. Thus, at both the port and each portable, symbol timing must be determined on a burst-by-burst basis.

One prior art method for determining symbol timing has used headers and/or training sequences combined with phase-locked loops to acquire symbol timing. Disadvantageously, bits and spectrum are wasted which is a particular problem since, in a TDM/TDMA portable radio communications system, the bursts need to be kept short to minimize delay which would otherwise impair speech transmission.

In U.S. Pat. No. 4,849,991 issued Jul. 18, 1989 to Hamilton W. Arnold and Nelson R. Sollenberger, the latter a co-inventor herein, a method and circuitry for determining symbol timing in time division multiple access radio systems is disclosed. In that method, each received burst is sampled at a rate that is sixteen times the symbol rate and stored in memory. The digitized samples are processed to obtain phase values and differential phase values are derived by introducing a one symbol delay, a differential phase value being derived for each of the sixteen sampling times per symbol. The differential phase values are compared with expected differential phase values and the absolute differences are accumulated for each of the sixteen sampling times over substantially the entire burst. The symbol timing for the burst is then selected to be the particular one-of-the-sixteen sampling times that results in the minimum sum of differences. Once the symbol timing is determined, the samples selected by the symbol timing are fed forward to coherent demodulation carrier recovery circuitry which demodulates the current burst stored in memory.

In addition to selecting the optimum one-in-sixteen sampling time for symbol timing, the circuitry in this prior art patent independently estimates frequency offset between the carrier frequencies of the transmitted and received signals and feeds forward an estimate of the frequency offset to the carrier recovery circuitry which then compensates for the offset in its detection functions.

It is the problem of frequency offset that has stimulated the present invention. Both the port and each portable have oscillators which are likely, as time passes, to drift away from each other. The frequency offset between the port oscillator and each portable's oscillator can be controlled through the use of expensive components with precise frequency standards. In order to keep the cost of the portable terminals at reasonable level, however, it is desirable to use cost effective components in each portable and to tolerate a reasonable degree of frequency offset between the transmitted and received carrier frequencies. Symbol timing estimation, however, is extremely sensitive to frequency offset. Once the frequency offset exceed some threshold value, the symbol timing estimator is likely not to select the "best" sampling time with a concomitant dramatic increase in the bit error rate that causes the entire receiver to fail.

An object of the present invention is to provide a method for symbol timing estimation that is significantly less sensitive to frequency offset and thus can tolerate a higher degree of frequency offset without a degradation in performance.

SUMMARY OF THE INVENTION

In accordance with the present invention, in a TDM/TDMA portable radio communications system, symbol timing and frequency offset are jointly estimated at the port and at each portable for each received burst by selecting the "best" sampling time using an algorithm which is significantly less sensitive to frequency offset than the prior art.

As in the prior art patent noted hereinabove, the received burst is converted to an IF signal and digitized at a sampling rate which is at least four and preferably sixteen times the symbol rate, over substantially the duration of the burst. Each digitized sample is processed to obtain in-phase and in-quadrature signals which are then converted to a phase value. A symbol delay is introduced and a difference taken to form differential phases values. These differential phase values, which would be expected to be clustered around four discrete phase values equally spaced by 90 degrees in the phase plane due to the QPSK modulation format, are collapsed into one quadrant. In accordance with the present invention the collapsed differential phases values at each sampling instant for each symbol are expanded back into four quadrants and the polar values converted to Cartesian coordinates. For each sampling instant for all symbols over substantially the duration of the burst, a vector sum is formed from the Cartesian coordinates of the expanded differential phase values. For sampling at sixteen times the symbol rate, symbol timing is determined to be the particular one-of-sixteen sampling instant at which the vector sum has the strongest coherency and thus the largest magnitude.

An estimate of the frequency offset is directly determined from the angle of that resultant largest summation vector and, in particular, the phase increment due to frequency offset in one symbol period is equal to one-forth of the vector angle.

BRIEF DESCRIPTION OF THE DRAWING

To facilitate understanding, identical reference numerals have been used, where appropriate, to designate identical elements that are common to the figures.

DETAILED DESCRIPTION

Figure 1:
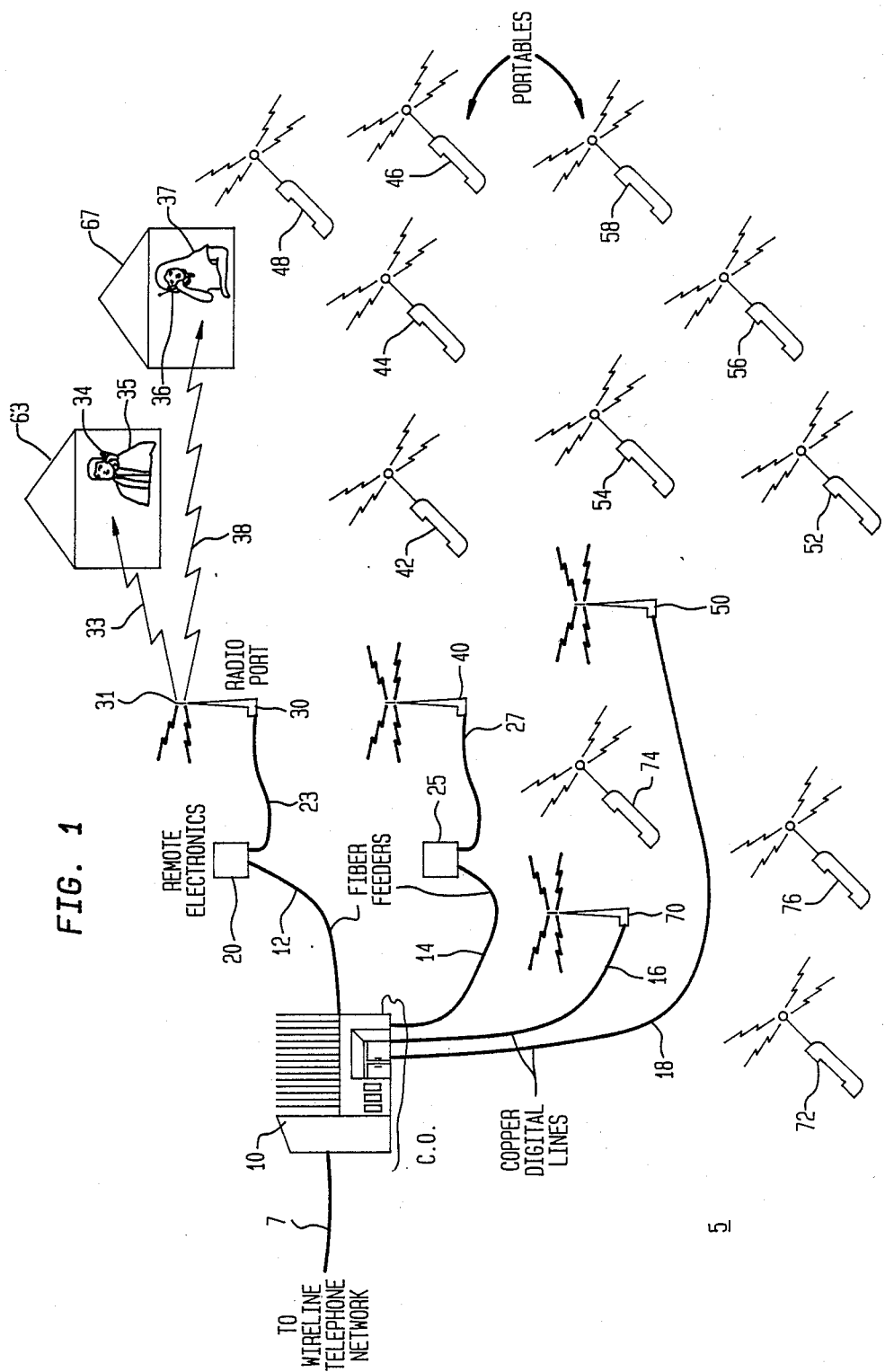
FIG. 1 is an overall diagram of a low power TDM/TDMA portable digital telephony system that incorporates the teaching of the present invention.

An overall diagram of low power portable TDM/TDMA digital telephony system 5 that incorporates the teachings of the present invention is shown in FIG. 1. Low power digital portable telephony utilizes a fixed base unit (hereinafter referred to as a "port") and a number of mobile transceivers (each of which is hereinafter referred to as a "portable"). Through use of time division multiple access (TDMA), each portable can access the port through a separate demand-assigned TDMA channel to carry duplex communication on a time division multiplexed (TDM) basis therebetween. The power used by the transmitter in each portable would range between 5-10 milliwatts or less on average and provide a range of several hundred to a thousand feet between a port and each of its portables. To accommodate a relatively large service area, several ports are used with individual calls being successively handed off from port to port as their corresponding callers carry their portables from the service area associated with one port to that of an adjacent port. An appropriate switch (not shown) which is located within a local central end office is suitably programmed to operate in a similar manner as does a mobile telephone switching office in order to controllably handoff calls from port to port as the callers transit corresponding local service areas associated therewith.

Specifically, system 5 contains four ports 30, 40, 50 and 70 and respective portables 34 and 36; 42, 44, 46 and 48; 52, 54, 56 and 58; and 72, 74 and 76. The ports themselves are connected to the switch located within central office 10 to provide access to a wireline telephone network. This connection can typically occur in one of two ways: either through copper digital lines 16 and 18 for illustratively ports 70 and 50, respectively, or via intermediary copper digital lines 23 and 27 to remote electronics 20 and 25 for illustratively ports 30 and 40, respectively. The remote electronics contain fixed distribution and concentration facilities for multiplexing traffic, in addition to that provided by ports 30 and 40, onto fiber feeders 12 and 14 which, in turn, feed central office 10. The switch located within the central office is connected, through trunk 7, to the wireline telephone network.

Each port would transmit time division multiplexed (TDM) bit streams on a predefined carrier frequency using quadrature phase shift keying (QPSK) modulation, with an inter-carrier spacing of 150 to 300 KHz and within a given operating frequency band situated somewhere between approximately simultaneously serve as many as typically 20 separate locally situated portables that each carries digitized speech at a bit rate of 16 kbits/second. Here, ports 30, 40, 50 and 70 respectively serve portables 34 and 36; 42, 44, 46 and 48; 52, 54, 56 and 58; and 72, 74 and 76. The same TDM channels would be reused at different ports that are spaced sufficiently far apart, such as ports 30 and 70, to reduce co-channel interference to an acceptably low level but yet conserve valuable spectrum. However, adjacent ports would be situated sufficiently close together in order to provide an appropriate degree of overlap of their respective service areas thereby ensuring no loss of coverage occurs during call handoff. Furthermore, each port utilizes a suitable antenna, such as antenna 31 for port 30, to carry its TDM transmissions to its associated portables and receive TDMA bursts therefrom. Given the carrier frequencies being used, each of these antennas is relatively small and suitable for mounting on a utility or light pole.

Inasmuch as system 5 replaces local copper drops and telephone cords with short range low power radio links, ambulatory callers are provided with completely tetherless access. Accordingly, through radio links 33 and 38, illustrative callers 35 and 37 located within respective residences 63 and 67 are completely free to move within the entire service area provided by system 5, i.e. that provided by ports 30, 40, 50 and 70, while advantageously maintaining continuity of their existing telephone conversations as well as being able to place calls through other ("non-home") ports as their travel progresses.

Each port continuously transmits on a TDM basis, while portables transmit in bursts on a TDMA basis to their associated port. Two different carrier frequencies are used to carry communication between each port and a portable: one frequency, frequency f1 for port 30, to carry communication from that port to each of its portables and another frequency, frequency f2 for port 30, to carry communication from each of these portables to this port. Although adjacent ports used different pairs of frequencies, these carrier frequencies are also reused for ports that are spaced sufficiently far apart from each other to conserve spectrum. The spacing is appropriately set to ensure that co-channel interference that might occur at any port will remain at an acceptably low level.

Figure 2:
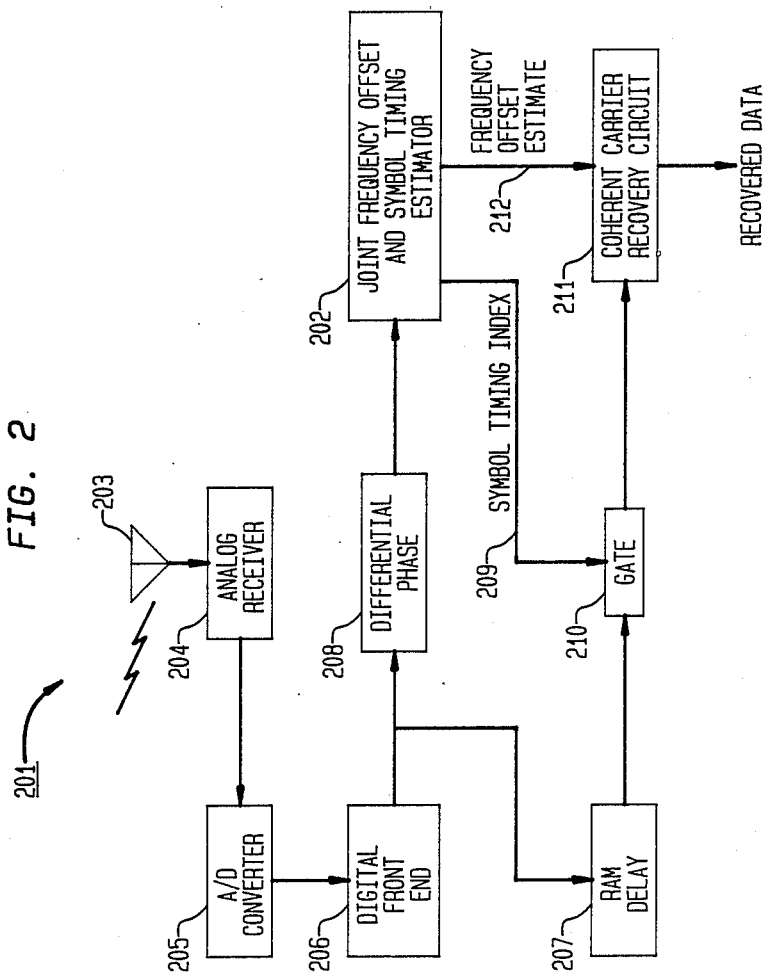
FIG. 2 is a block diagram of the demodulating circuitry at either the port or a portable that converts the received radio transmission into a data stream, and which circuitry includes the joint frequency offset and symbol timing estimator of the present invention.

FIG. 2 shows a block diagram of a digital demodulator 201 that incorporates the joint frequency offset and symbol timing estimator 202 of the present invention. This demodulator would be incorporated at both the port and at each portable unit in a TDM/TDMA portable radio communications system. As aforenoted, the port transmits TDM bursts of 90 symbols while the portable transmits TDMA bursts of 82 symbols. For purposes of the discussion hereinafter, it will be assumed that the demodulator in FIG. 2 represents a demodulator in a portable unit and therefore receives bursts of 90 symbols transmitted by the port.

An antenna 203 receives each radio transmitted burst having a carrier frequency in the range of 0.5 to 5 GHz. Analog receiver 204 amplifies, filters and downconverts the radio frequency signal to a 1 MHz IF signal. Analog-to-digital converter 205 digitizes the IF signal by sampling at sixteen times the symbol rate, for this system the latter being 250 KHz. The A/D sampling rate is thus 4 MHz. Digital front-end circuitry 206 translates the digital signal to baseband which is low pass filtered to obtain in-phase (I) and in-quadrature (Q) signals. A ROM in the front-end circuitry 206 serves as a look-up table of arctangents to determine the phase of each sample from the I and Q signals. For each burst of 90 symbols, the output of circuitry 206 thus consists of 1440 (90×16) phase samples which are stored in a one burst RAM delay 207.

As the phase values of the over-sampled burst are stored in RAM delay 207, the burst is simultaneously processed by the circuitry of the present invention. In particular, the present invention processes each burst to select the particular sampling time, among the sixteen sampling times per symbol, that is most likely to be closest to desired sampling instant which has the smallest timing error. As will be described in detail hereinafter, joint frequency offset and symbol timing estimator 202 processes differential phase values at each of the possible sixteen sampling times over substantially the entire burst to select the optimum one-in-sixteen sampling time.

Figure 3:
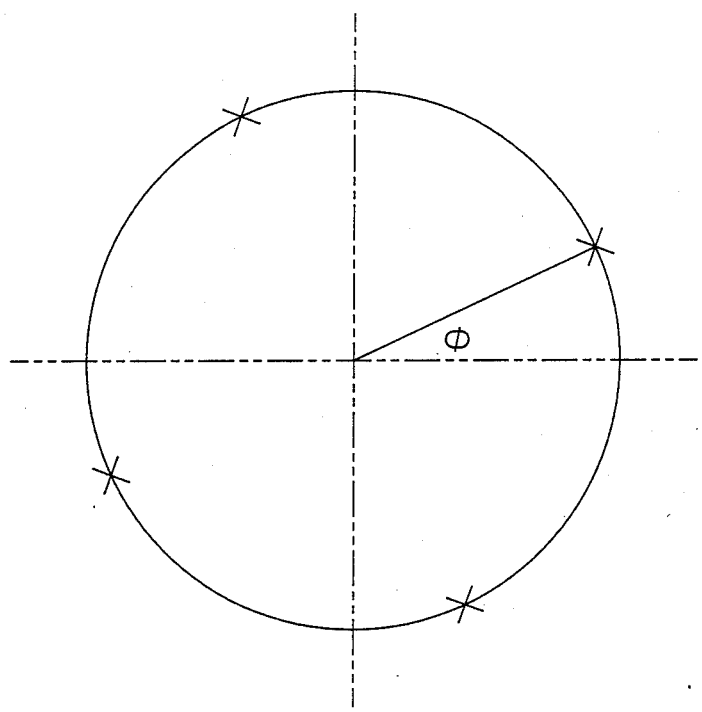
FIG. 3 shows the differential phase constellation in the presence of a constant frequency offset for the circuit in FIG. 2.

Since there is no known a priori reference angle with which to compare the received phase outputs of front end circuitry 206 with, a differential phase circuit 208 forms differential phase values by imparting a one symbol delay (sixteen samples) to the output of circuit 206 and forming a difference between each current sample phase and the phase sixteen samples previously. For QPSK modulation, it would be expected that at the sampling time closest to the optimum time, the differential phase values would be either 0, 90, 180 or 270 degrees. Noise and interference, however, will cause a deviation between the actual phase values and these expected phase values over the burst. Also, a frequency offset that is constant over the burst will impart a rotation to the constellation of phase values. FIG. 3 shows the resultant constellation of expected phase values at the output of differential phase circuit 208. As can be noted, the expected differential phase values are separated by 90 degrees in the phase plane but are offset from the axes by an angle $\phi$, $\phi$ representing the phase increment due to frequency offset in one symbol period.

In the aforenoted prior art patent, the particular sampling instant, amongst the sixteen possibilities, is selected by evaluating for each of the possibilities, the tightness of the cluster over most of the burst since, at this optimum time, the differential phase values are most closely grouped together around the expected values. In order to more easily evaluate the tightness of the cluster the differential phase values are collapsed into one quadrant by removing the two most-significant-bits (MSB) of the digital differential phase values. The tightness of the clusters for each of the sixteen sampling times are evaluated by summing the absolute differences between the collapsed differential phase values and the expected phase value, i.e. zero degrees. Symbol timing is then selected to be that sampling time that yields the minimum sum of differences. It has been found, however, that as frequency offset increases, these sum of differences are not likely to be an accurate indicator of the "best" sampling time for symbol timing and, in fact, are likely to point to a sampling time substantially displaced from the optimum time. As a result, when this inaccurate symbol timing is used in a carrier recovery circuit, the recovered data is likely to have a high error rate, and in the extreme, causes the recovery circuit to totally fail.

The joint frequency offset and symbol timing estimator 202 of the present invention, to be described in detail hereinafter, employs an algorithm that is substantially more robust to frequency offset. As a result, a significantly larger frequency offset can be tolerated while still achieving an acceptable performance level. In particular, estimator 202 evaluates the tightness of the clusters of differential phase values for each of the sixteen sampling instants by examining the coherency of each cluster rather than differences between the differential phases and expected values, the latter, in the presence of frequency offset, not being actually determinable.

Again, the differential phase values at the output of circuit 208 are collapsed into one quadrant to make the evaluation independent of in which quadrant these phase values lie. The polar coordinate on the unit circle of each collapsed differential phase value, however, is expanded by a factor of four into a full plane representation. For each of the sixteen sampling times, a vector sum over substantially the entire burst is formed from the collapsed and expanded clusters by separably summing the Cartesian X coordinates of the polar collapsed and expanded phase values, and the corresponding Cartesian Y coordinates. At the optimum sampling time the constellation will be the most coherent and the summation vector will add most strongly to yield the largest magnitude vector. At sampling instants offset from the optimum symbol timing, the collapsed and expanded differential phase values will not be as tightly clustered together over the burst and the resultant vector sum will not produce a summation vector having as large a magnitude as at the "best" sampling instant.

Frequency offset can be directly determined from this largest magnitude summation vector by noting that the polar angle of this vector represents four times the phase increment due to frequency offset in one symbol period. Thus once the largest vector is selected, estimator 202 determines its angle, and thus the frequency offset, using the arctangent function and its X and Y coordinates.

Estimator 202, once having determined which sampling time is "best" for symbol timing, forwards the index of that sampling time to a gate 210. The phase values stored in RAM delay 207 at the selected "best" sampling time are gated, one sample per symbol, to coherent carrier recovery circuit 211. The frequency offset on lead 212 is also input to carrier recover circuit 211 so that that latter may compensate for the detected offset. An example of circuitry that may be used for coherent carrier recovery circuit 211, is the subject of co-pending patent application of the inventors of the present invention, Ser. No. 213,082, filed Jun. 29, 1988. It is also disclosed in the aforenoted U.S. Pat. No. 4,849,991. The output of circuit 211 is the recovered bit stream which, at each portable unit, is converted by a digital-to-analog circuit, to a voice signal for reception by the user.

Figure 4:
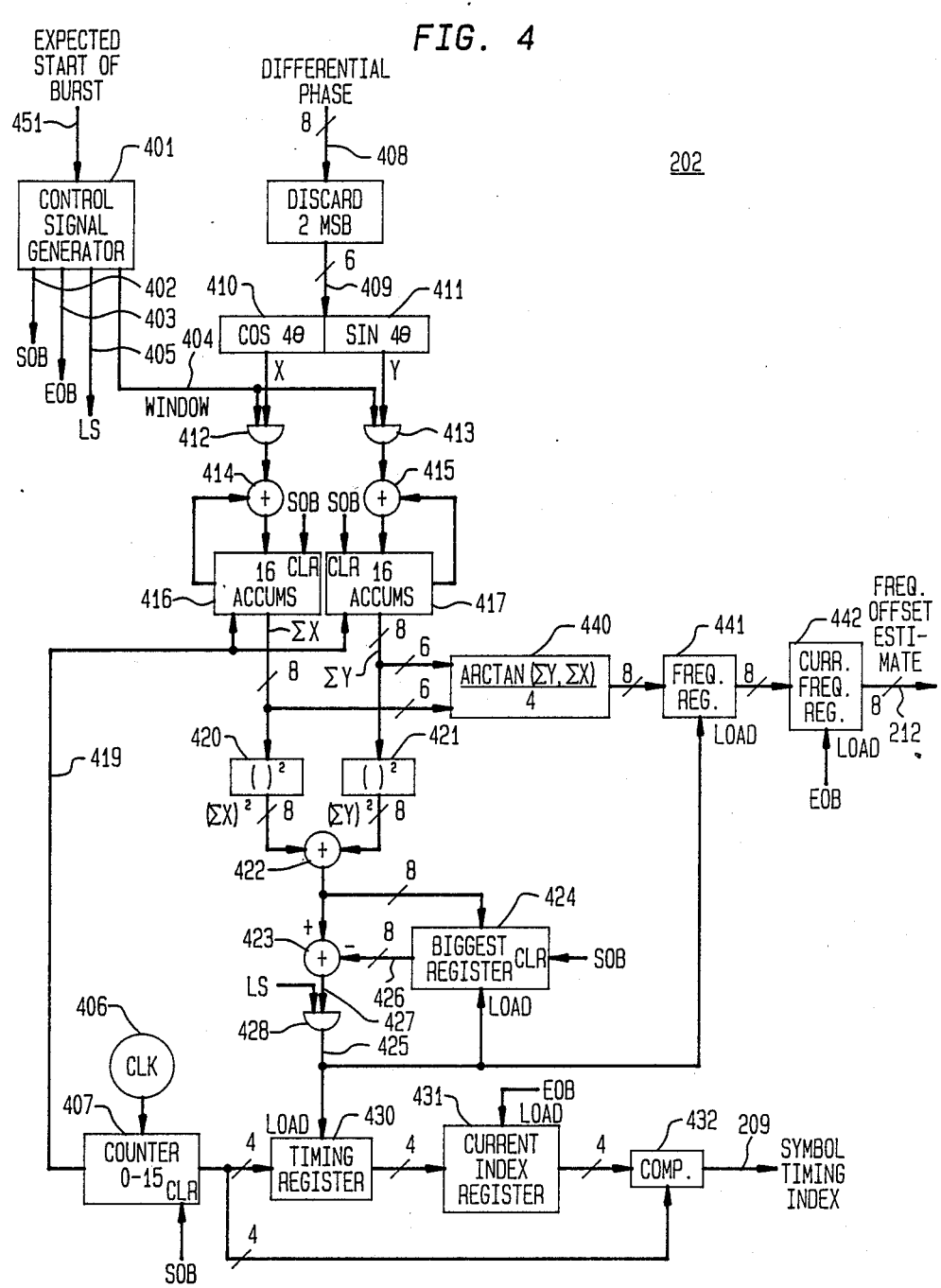
FIG. 4 is a block diagram of the joint frequency offset and symbol timing estimator of the present invention.

Joint frequency offset and symbol timing estimator 202 will be described with reference now to the block diagram in FIG. 4. Estimator 202 includes a control signal generator which, in response to an expected start of burst signal on lead 451, generates the control signals used by the various circuit blocks. In the port, the expected start of block signal has a fixed timing relationship to the transmit burst position. In the portable units, this signal can be generated using a technique which can derive the approximate start of a burst such as a technique described in a co-pending patent application of S. Ariyavisitakul, L. F. Chang and N. R. Sollenberger, Ser. No. 404,946, filed Sept. 8, 1989, the latter inventor being a co-inventor of the present invention. The signals generated by control signal generator 401 include a start of burst (SOB) signal on lead 402, in response to the first clock cycle in the burst, and an end of burst signal (EOB) on lead 403, in response to the last clock cycle in the burst. A window signal which is active for that preset subset of the burst during which symbol timing is processed is also generated on lead 404. In particular, only the 64 symbol periods in the center of the 90 symbol burst are employed for symbol timing purposes, 13 symbols being clipped from each end of the burst. By eliminating the edges of the burst for purposes of symbol timing and frequency offset estimation, the uncertainty as to exactly when a burst arrives can be eliminated and only that data in the center of the burst that is free of noise and interference considerations need be considered for symbol timing purposes. During the last symbol of the burst, LS lead 405 is active. As will be noted, during this last symbol period, which follows the active window period, the magnitude of the sum vectors for each of the sixteen sampling instants are calculated and the sampling time associated with the largest sum vector is determined.

A free running clock 406 operating at the sampling rate of 4 MHz, equal to sixteen times the symbol rate, is connected to a counter 407 which counts sample times modulo 16, from the start of each burst and in response to the SOB signal at its clear input.

Differential phase values from differential phase circuit 208 at each of the sixteen sampling instants per symbol are input to estimator 202 in parallel format over 8 input leads 408. Each sample represents, in polar coordinates, the differential phase angle on the unit circle in the phase plane. As aforenoted, by discarding the two MSB of this input, the differential phase values are collapsed into the first quadrant of the phase plane which has the effect of removing the modulation from the differential phase samples. The resultant collapsed one-quadrant differential phase values are then expanded into the full four-quadrant phase plane by multiplying these phase values by a factor of four and then converting them from polar into Cartesian coordinates. The collapsed differential phase values on leads 409 are thus input to ROM look-up tables 410 and 411 which produce at their outputs, $\cos 4\theta$ and $\sin 4\theta$, respectively, of the input phase angle, $\theta$. The outputs of ROM tables 410 and 411 thus represent the X and Y components, respectively, of the expanded collapsed differential phase angles in Cartesian coordinates.

If the sixteen-times sampled symbol is within the prescribed window (the 14through 77th symbol), then lead 404 at the output of control generator 401 is active and the X and Y components of the sampled differential phase are gated through AND gates 412 and 413, respectively. The outputs of gates 412 and 412 are input to adders 414 and 415, respectively, and the outputs thereof to 16-bin accumulators 416 and 417, respectively. Accumulators 416 and 417 are cleared at the beginning of each burst by an SOB pulse from control signal generator 401. The inputs to accumulators 416 and 417 are cycled through each of the sixteen bins in response to the 0–15 count of counter 407 on lead 419 which counts modulo 16 at the sampling timing rate of 4 MHz, equal to sixteen times the symbol rate. In accordance with the count of counter 407, the values stored in the appropriate bins of accumulators 416 and 417 are fed back to the adders 414 and 415, respectively. Adders 414 and 415 thus sum the current X and Y components at the outputs of AND gates 412 and 413, respectively, with the corresponding accumulated sums. The new sums are then input to the accumulators. Each bin in accumulator 416 and 417 contains for the associated sampling instant, the sum of X components, $\Sigma X$, and the sum of Y components, $\Sigma Y$, respectively, as the burst is processed.

In order to determine the sampling time yielding the largest sum vector, the length of the vector resulting from the sum of the X and Y components is calculated. The length of this vector is equal to the square root of the sum of the square of the sum of the X components and the square of the sum of the Y components. Therefore $(\Sigma X)^2+(\Sigma Y)^2$ is calculated for each of the sixteen sampling instants, and the sampling instant associated with that largest vector then determined. The outputs of accumulators 416 and 417 which cycle through their 16 bins in response to the counter of counter 407, are input to ROM squaring tables 420 and 421, respectively. The output of ROM 420 is thus $(\Sigma X)^2$ and the output of ROM 421 is $(\Sigma Y)^2$. These outputs are summed by adder 422. Since the outputs of ROMs 420 and 421 and thus adder 422 are changing during the window period from the 14th through the 77th symbol, determination of the largest sum is after the last symbol in the window, and in particular during the last symbol of the burst. During this last symbol period, for the sixteen sampling instants, the last symbol LS output of generator 401 is active, which permits, as detailed hereinafter, the determination of the sampling instant at which the largest vector of length $(\Sigma X)^2+(\Sigma Y)^2$ occurs.

The output of digital adder 422 is input to subtracter 423 and a register 424 which holds the magnitude of the biggest vector as the accumulators 416 and 417 are cycled through their 16 bins. Register 424 is cleared at the beginning of the burst by an SOB pulse and is loaded with the output of adder 422 only if its load input, connected to the output 425 of AND gate 428, is active. Register 424 can thus only be loaded at one of sixteen sample instants during the last symbol period. The value stored in register 424 is also present on leads 426 which form the second input to subtracter 423. Subtracter 423 forms the difference between the output of adder 422 and the value stored in register 424 and produces an active output on lead 427 only when this difference is positive.

During the last symbol period, at the first sample instant when the count of counter 407 is zero, the $\Sigma X$ values and the $\Sigma Y$ values in the first bins in accumulators 416 and 417, respectively, are squared and summed and read into register 424 since, at that instant, the output of subtracter 423 and thus the output 425 of AND gate 428 are active. At the second sample instant, when the count of counter 407 is 1, the second bins of accumulators 416 and 417 are squared and summed. If the sum at the output of adder 422 is larger than the sum stored in register 424 at the first sampling instant, then the output of subtracter 423 and output 425 remain active and this new value is loaded in register 424 replacing the value loaded at the first sampling instant. If the sum at the output of adder 422 is, however, smaller than the sum already stored in register 424, then the output of subtracter is inactive, thereby deactivating output 425 and preventing the new sum at the output of adder 422 from being loaded.

The output of AND gate 428 is also connected to the load input of a timing register 430, the input of which is connected to counter 407. When a vector magnitude is loaded into register 424, the associated count of counter 407 is simultaneously loaded into register 430. Thus as counter 407 cycles through its sixteen counting positions, register 424 holds the magnitude of the largest vector sum so far and timing register 430 holds the associated sampling instant at which that largest vector occurred. At the end of the sixteen sampling instants in the last symbol period, the desired largest vector magnitude is held in register 424 and its associated sampling instant is held in register 430. It is this sampling instant that is selected for symbol timing of the entire burst being held in the RAM delay 207 in FIG. 2.

At the end of the burst and in response to an end-of-burst EOB signal from generator 401, the symbol timing sampling instant in register 430 is loaded in register 431 which holds the index of the sampling time used to demodulate the previous burst. As counter 407 continues to count modulo 16, its count is compared by comparator 432 with the new symbol timing in register 431. When equal, during each symbol period, comparator 432 generates a pulse on its output 209 (also noted in FIG. 2). With reference to FIG. 2, this pulse on lead 209 is input to gate 210 which gates the appropriate 1-out-of-16 sampled phase value out of RAM delay 207 to the coherent carrier recovery circuit 211 for data recovery.

In order to compensate for frequency offset between the port and the portable unit, recovery circuit 211 also requires an estimate of the offset. Frequency offset estimation is simultaneously performed with symbol timing determination. As previously noted, an estimate of frequency offset is determined from the angle that the largest summation vector makes in the phase plane. Thus once the largest vector is determined, its angle can be found from its abscissa and ordinate components. With reference again to FIG. 4, the six MSB leads of the 8 parallel output leads of accumulators 416 and 417 are input to arctangent ROM 440. ROM 440 serves as a look-up table to determine $$\frac{\arctan(\Sigma Y, \Sigma X)}{4}.$$

The output of ROM 440 is input to frequency register 441 which is loaded only when the output 425 of AND gate 428 is active. At the end of the sixteen sampling instants in the last bit interval, therefore, the angle stored in register 441 is the angle corresponding to the summation vector having the largest magnitude and is equal to the phase increment due to frequency offset in a one symbol period. At the end of the burst, and in response to an EOB pulse, the angle stored in register 441 is loaded into current frequency register 442 for processing the burst stored in RAM delay 207 to be input to the carrier recovery circuit 211 (in FIG. 2). This offset estimation is thus provided over leads 212 to the coherent carrier recovery circuit 211.

Figure 5:
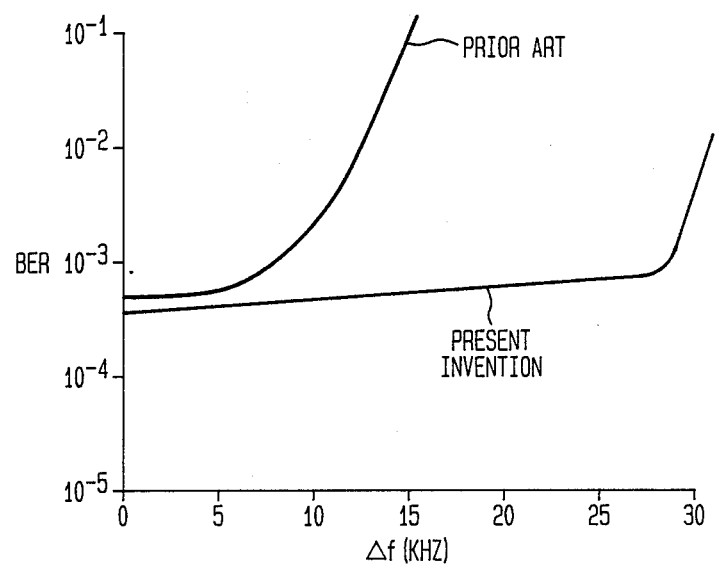
FIG. 5 illustrates a graph of bit error rate performance versus frequency offset for both the prior art and the present invention.

FIG. 5 shows the bit error rate performance as a function of frequency offset using the method of the present invention and the method of the prior art for a 10 dB signal-to-noise (SNR) ratio for the parameters of the system described, i.e. symbol rate of 250 KHz, sampling at 4 MHz, and a 1 MHz IF signal. As can be noted, the prior art method cannot tolerate a frequency offset greater than 10 KHz while the method of the present invention has essentially no degradation until 27 KHz.

The above-described embodiment is illustrative of the principles of the present invention. Other embodiments could be devised by those skilled in the art without departing from the spirit and scope of the present invention.

What is claimed is:

1. A method of determining symbol timing in the processing of a digital phase modulated radio signal transmission consisting of sequential bursts of symbols, comprising the steps of:
    converting an intermediate frequency (IF) radio signal from a modulated sinusoid into phase values after sampling said IF radio signal at a plurality of sampling times per symbol at a sampling rate which is a multiple of the symbol rate by at least a factor of four;
    obtaining differential phase values at each sampling time from said phase values by introducing at least a one symbol delay and taking differences between delayed phase values and corresponding present phase values;
    collapsing said differential phase values into one quadrant in the phase plane;
    expanding said collapsed differential phase values into a full 360 degree polar phase plane; and
    obtaining symbol timing by selecting from amongst the set of sampling times the particular sampling time at which the vector sum of the collapsed and expanded differential phase values, substantially over an entire burst, has the largest magnitude.

2. The method of claim 1 further comprising the step of:
    obtaining a frequency offset estimate from the angle made in the phase plane by the vector sum with the largest magnitude.

3. The method of claim 1 wherein said sampling rate is a factor of sixteen times said symbol rate.

4. The method of claim 1 further comprising the step of:
    storing the converted phase values at each sampling time of said sampled IF radio signal while said symbol timing is being determined.

5. The method of claim 4 further comprising the step of:
    selecting for demodulation the stored phase values at the determined symbol timing.

6. A method for obtaining a symbol timing estimate in the processing of a digital phase modulated radio signal consisting of sequential bursts of symbols, comprising the steps of:
    digitizing an intermediate frequency (IF) signal at a plurality of sampling times per symbol at a sampling rate which is a multiple of the symbol timing rate by at least a factor of four;
    processing the digitized signal to obtain in-phase and in-quadrature signals;
    converting said in-phase and in-quadrature signals to phase values at each sampling time;
    obtaining differential phase values from said phase values by introducing at least a one symbol delay and taking differences between delayed phase values and corresponding present phase values;
    collapsing said differential phase values into values between 0 and 90 degrees in the phase plane;
    expanding said collapsed differential phase values into values between 0 and 360 degrees in the phase plane;
    forming the vector sums in the phase plane of the collapsed and expanded differential phase values separately for each sampling time and substantially over the entire burst; and
    obtaining symbol timing by selecting from amongst the set of sampling times the particular sampling time at which the vector sum of the collapsed and expanded differential phase values has the largest magnitude.

7. The method of claim 6 further comprising the step of:
    obtaining a frequency offset estimate from the angle made in the phase plane by the vector sum having the largest magnitude.

8. The method of claim 6 wherein said sampling rate is a factor of sixteen times the symbol rate.

9. The method of claim 6 further comprising the step of:
    storing the converted phase values at each sampling time of said sampled IF radio signal while said symbol timing is being determined.

10. The method of claim 9 further comprising the step of:
    selecting for demodulation the stored phase values at the determined symbol timing.

11. A method of determining symbol timing in the processing of a digital phase modulated radio signal transmission consisting of sequential bursts of symbols, comprising the steps of:

converting an intermediate frequency (IF) radio signal from a modulated sinusoid into phase values after sampling said IF radio signal at a plurality of sampling times per symbol at a rate which is a multiple of the symbol rate by at least a factor of four;

obtaining differential phase values at each sampling time from said phase values by introducing at least a one symbol delay and taking differences between delayed phase values and corresponding present phase values;

collapsing said differential phase values into polar values between 0 and 90 degrees in the phase plane;

expanding said collapsed differential polar phase values into polar values between 0 and 360 degrees in the phase plane;

converting the polar values of said expanded and collapsed differential phase values into Cartesian coordinates;

summing separately for each sampling time and substantially over the entire burst the X Cartesian coordinates of the expanded and collapsed differential phase values, and summing separately for each sampling time and substantially over the entire burst the Y Cartesian coordinates of the expanded and collapsed differential phase values;

for each sampling time squaring the sum of the X coordinates and squaring the sum of the Y coordinates, for each sampling time adding the square of the sum of the X coordinates and the square of the sum of the Y coordinates; and determining at which sampling time the sum of the square of the sum of the X coordinates and the square of the sum of the Y coordinates has the largest magnitude and using that sampling time as the time for symbol timing.

12. The method of claim 11 further comprising the step of:

calculating for each sampling time an angle equal to one-fourth the arctangent (sum of the Y components, sum of the X components) and determining the estimate of frequency offset from the angle calculated at the sampling time chosen for symbol timing.

13. The method of claim 11 wherein said sampling rate is a factor of sixteen times said symbol rate.

14. The method of claim 11 further comprising the step of:

storing the converted phase values at each sampling time of said sampled IF radio signal while said symbol timing is being determined.

15. The method of claim 14 further comprising the step of:

selecting for demodulation the stored phase values at the determined symbol timing.

16. A circuit for providing a symbol timing estimate in the processing of a digital phase modulated radio signal transmission consisting of sequential bursts of symbols, comprising:

means for digitizing an intermediate frequency (IF) signal at a plurality of sampling times per symbol at a sampling rate which is a multiple of the symbol rate by at least a factor of four;

means for processing the digitized signal to obtain in-phase and in-quadrature signals;

means for converting the in-phase and in-quadrature signals to phase values at each sampling time;

delay and differencing means for introducing at least a one symbol delay and taking differences between delayed phase values and corresponding present phase values to form differential phase values;

means for collapsing said differential phase values into values between 0 and 90 degrees in the phase plane;

means for expanding said collapsed differential phase values into values between 0 and 360 degrees in the phase plane;

means for forming the vector sums in the phase plane of the collapsed and expanded differential phase values separately for each sampling time and substantially over the entire burst;

means for determining the vector sum with the largest magnitude; and means for obtaining symbol timing by selecting amongst the set of sampling times the sampling time associated with the vector sum having the largest magnitude.

17. The circuit in claim 16 further comprising means for obtaining an estimate of frequency offset from the angle made in the phase plane by the vector sum having the largest magnitude.

18. The circuit in claim 16 wherein said sampling rate is a factor of sixteen times the symbol rate.

19. The circuit in claim 16 further comprising means for storing the converted phase values at each sampling time of said sampled IF radio signal while said symbol timing is being obtained.

20. The circuit in claim 19 further comprising means for selecting for demodulation the stored phase values at the determined symbol timing.

21. A circuit for providing a symbol timing estimate in the processing of a digital phase modulated radio signal transmission consisting of sequential bursts of symbols, comprising:

means for converting an intermediate frequency (IF) radio signal from a modulated sinusoid into phase values at a plurality of sampling times per symbol at a sampling rate which is a multiple of the symbol rate by at least a factor of four;

delay and differencing means for introducing at least a one symbol delay and taking differences between delayed phase values and corresponding present phase values;

means for collapsing said differential phase values into one quadrant in the phase plane;

means for expanding said collapsed differential phase values into a full 360 degree polar phase plane;

means for forming the vector sums in the phase plane of the collapsed and expanded differential phase values separately for each sampling time and substantially over the entire burst;

means for determining the vector sum with the largest magnitude; and means for obtaining symbol timing by selecting amongst the set of sampling times the sampling time associated with the vector sum having the largest magnitude.

22. The circuit in claim 21 further comprising means for obtaining an estimate of frequency offset from the angle made in the phase plane by the vector sum having the largest magnitude.

23. The circuit in claim 21 wherein said sampling rate is a factor of sixteen times the symbol rate.

24. The circuit in claim 21 further comprising means for storing the converted phase values at each sampling time of said sampled IF radio signal while said symbol timing estimate is being obtained.

25. The circuit in claim 24 further comprising means for selecting for demodulation the stored phase values at the determined symbol timing.

26. A circuit for determining symbol timing in the processing of a digital phase modulated radio signal transmission consisting of sequential bursts of symbols, comprising:

means for converting an intermediate frequency (IF) radio signal from a modulated sinusoid into phase values after sampling said IF radio signal at a plurality of sampling times per symbol at a rate which is a multiple of the symbol rate by at least a factor of four;

delay and differencing means for introducing at least a one symbol delay and taking differences between delayed phase values and corresponding present phase values;

means for collapsing said differential phase values into polar phase values between 0 and 90 degrees in the phase plane;

means for expanding said collapsed differential phase values into polar values between 0 and 360 degrees in the phase plane;

means for converting the polar values of said expanded and collapsed differential phase values into Cartesian coordinates;

first summing means for summing separately for each sampling time and substantially over the entire burst the X Cartesian coordinates of the expanded and collapsed differential phase values [$\Sigma X$];

second summing means for summing separately for each sampling time and substantially over the entire burst the Y Cartesian coordinates of the expanded and collapsed differential phase values [$\Sigma Y$];

first squaring means for squaring for each sampling time the sum of the X coordinates [$(\Sigma X)^2$];

second squaring means for squaring for each sampling time the sum of the Y coordinates [$(\Sigma Y)^2$];

adding means for forming a vector sum for each sampling time by adding the square of the sum of the X coordinates and the square of the sum of the Y coordinates [$(\Sigma X)^2 + (\Sigma Y)^2$];

means for determining which vector sum has the largest magnitude;

means for determining symbol timing as that sample time associated with the vector sum with the largest magnitude.

27. The circuit in claim 26 further comprising means for calculating for each sampling time the angle equal to $$\frac{\arctan(\Sigma Y, \Sigma X)}{4}$$

and determining the estimate of frequency offset from the angle calculated at the sampling time chosen for symbol timing.

28. The circuit in claim 26 wherein said sampling rate is a factor of sixteen times said symbol rate.

29. The circuit in claim 26 further comprising means for storing the converted phase values at each sampling time of said sampled IF radio signal while said symbol timing estimate is being determined.

30. The circuit in claim 29 further comprising means for selecting for demodulation the stored phase values at the determined symbol timing.

* * * * *